United States Patent
Kodama et al.

[11] Patent Number: 5,876,804
[45] Date of Patent: Mar. 2, 1999

[54] EXTRUSION DIE FOR MOLDING HONEYCOMB STRUCTURE AND MANUFACTURING METHOD THEREOF

[75] Inventors: Kunihiro Kodama; Hiroshi Furuhashi, both of Nagoya; Hiroshi Takatsu, Hekinan, all of Japan

[73] Assignee: Denso Corporation, Japan

[21] Appl. No.: 857,498

[22] Filed: May 16, 1997

[30] Foreign Application Priority Data

May 16, 1996 [JP] Japan .................................... 8-148126

[51] Int. Cl.⁶ ................... B05D 1/18; B21K 5/20
[52] U.S. Cl. ............. 427/436; 427/135; 427/282; 427/438; 425/462; 425/463; 76/107.1; 29/530; 29/557; 29/558
[58] Field of Search .................... 427/436, 282, 427/98, 135, 438; 425/463, 462; 76/107.1; 29/888.453, 530, 557, 558, 527.3, 527.2

[56] References Cited

U.S. PATENT DOCUMENTS

| 4,278,412 | 7/1981 | Ozaki et al. ........................ 425/198 |
| 4,486,934 | 12/1984 | Reed ................................ 29/163.5 R |
| 4,861,626 | 8/1989 | Ihara et al. ........................... 427/133 |
| 5,070,588 | 12/1991 | Miwa et al. ........................... 29/407 |

FOREIGN PATENT DOCUMENTS

| 61-000164 | 1/1986 | Japan . |
| 61-039167 | 9/1986 | Japan . |
| 5-079002 | 11/1993 | Japan . |

Primary Examiner—Shrive Beck
Assistant Examiner—Michael Barr
Attorney, Agent, or Firm—Pillsbury Madison & Sutro, LLP

[57] ABSTRACT

An extrusion die for forming a honeycomb structure such as a catalyst carrier of a catalytic converter for internal combustion engines is provided. The extrusion die includes material inlet ports and latticed slits. The slits are formed in a die base and have first inner walls leading to an outer surface of the die base and second inner walls leading to the material inlet ports, respectively. Metal-plated layers are formed on the first inner walls of the slits to define outlets of the die and have the width smaller than those of the second inner walls of the slits, respectively. This die structure facilities easy extrusion of the honeycomb structure made up by thin honeycomb walls with a smaller extrusion resistance.

6 Claims, 4 Drawing Sheets

EXTRUSION DIE FOR MOLDING HONEYCOMB STRUCTURE AND MANUFACTURING METHOD THEREOF

BACKGROUND OF THE INVENTION

1. Technical Field

The present invention relates generally to an improvement on an extrusion die for molding a honeycomb structure such as a catalyst carrier of a catalytic converter for internal combustion engines and a method of manufacturing the same.

2. Background of Related Art

FIG. 4 shows a catalyst carrier of a conventional catalytic converter used in an internal combustion engine exhaust system.

The catalyst carrier is formed with a honeycomb structure 8 consisting of latticed cell walls 81 defining cells 82. The honeycomb structure 8 is usually formed by extruding a ceramic material into a honeycomb shape, cutting it to a desired length, and drying it.

FIG. 5 shows a conventional extrusion die for forming the honeycomb structure 8 which includes material inlet ports 4 and latticed slits 92 communicating with the material inlet ports 4. The ceramic material is forced into the latticed slits 92 through the material inlet ports 4 to form the honeycomb structure 8.

In recent years, there is an increasing need for the honeycomb structure 8 to be decreased in thickness of the cell walls 81 for lightening and improvement of performance thereof. The thinning of the cell walls 81 of the honeycomb structure 8 requires reduction in width of the silts 92 of the extrusion die. The reduction in width of the slits 92 will, however, cause the resistance to extrusion of the material through the slits 92 to be increased, necessitating the use of a large extruder.

In order to avoid the above problem, it is effective to shorten the length of the slits 92 in the direction of extrusion. This, however, encounters a drawback in that the material injected from the material inlet ports 4 is extruded out of the die without spreading all over the latticed slits 92, thereby leading to the formation of defects in the honeycomb structure 8. Specifically, the formation of the honeycomb structure 8 without any extrusion defects requires a sufficient length of the slits 92 in the direction of extrusion.

Japanese Patent Second Publication No. 61-164 discloses an extrusion die, as shown in FIG. 6, for a honeycomb structure designed to alleviate the above problem. The extrusion die 902 has, as clearly shown in the drawing, latticed slits 92 of a stepped structure. Specifically, each of the slits 92 has a wide portion 93 leading to one of the material inlet ports 4.

This structure eliminates the lack of spread of the material in the slits 92, yet it allows the length of the slits 92 in the direction of extrusion to be decreased. This permits the width of the slits 92 to be decreased without increasing the extrusion resistance, resulting in a decrease in thickness of the cell wall.

The above extrusion die, however, has the following drawback.

The formation of the wide portions 93 of the slits 92 requires a complex manufacturing process, resulting in a great increase in number of machining processes.

The formation of the wide portions 93 wider than the slits 92 makes it difficult to machine the material inlet ports 4 and the slits 92 in a single steel plate. It is, thus, necessary to machine the material inlet ports 4 and the slits 92 in different steel plates and bond them into a single piece. This results in a rise in manufacturing cost of the honeycomb structure.

SUMMARY OF THE INVENTION

It is therefore a principal object of the present invention to avoid the disadvantages of the prior art.

It is another object of the present invention to provide an inexpensive extrusion die designed to mold a thin honeycomb structure with a small extrusion resistance and a manufacturing method thereof.

According to one aspect of the present invention, there is provided a die for extruding a honeycomb structure which comprises: (a) a base having a first surface and a second surface opposite the first surface; (b) material inlet ports formed in the first surface of the base from which material for the honeycomb structure is supplied to the die; (c) slits formed in the second surface of the base in a matrix arrangement, having first inner walls and second inner walls continuing the first inner walls, the first inner walls leading to the second surface of the base, the second inner walls leading to the material inlet ports; and (d) metal-plated layers formed on the first inner walls of the slits to define outlets of the die having a width smaller than those of the second inner walls of the slits.

In the preferred mode of the invention, a ratio of the width of each of the outlets to the width of each of the second inner walls ranges from 0.25 to 0.9.

According to another aspect of the invention, there is provided a method of manufacturing a die for extruding a honeycomb structure which comprises the steps of: (a) preparing a die base having a first surface and a second surface opposite the first surface; (b) forming material inlet ports in the first surface of the die base from which material for the honeycomb structure is supplied; (c) forming in the second surface of the die base latticed slits of a constant width having first inner walls leading to the second surface of the die base and second inner walls leading to the material inlet ports, respectively; and (d) immersing at least the first inner walls of the latticed slits in a plating solution to form plated layers on the first inner walls to define outlets of the die having a width smaller than those of the second inner walls of the slits.

In the preferred mode of the invention, the step is further provided which closes the material inlet ports before the immersing step.

The step may alternatively be provided which fills in the material inlet ports with a given filler prior to the immersing step.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
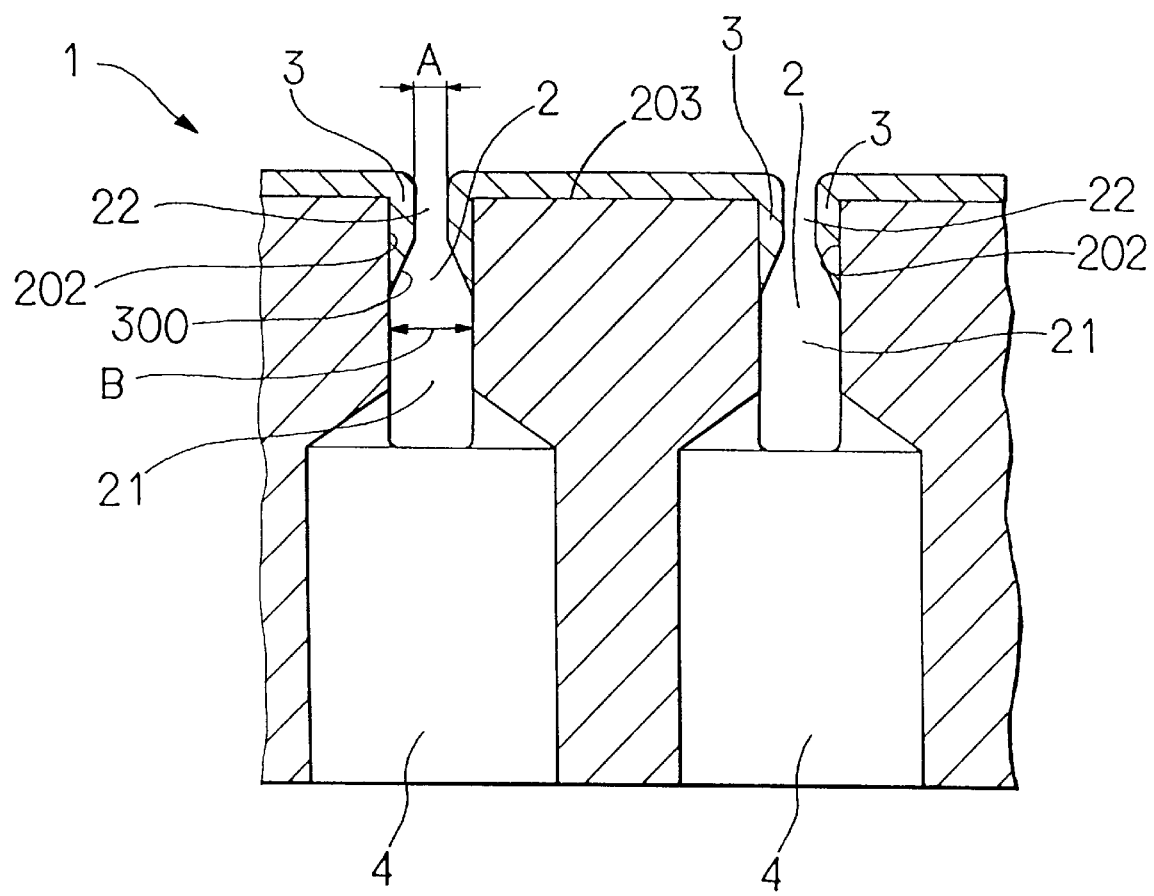
FIG. 1 is a partially cross sectional view which shows an extrusion die of the present invention.

Referring now to the drawings, particularly to FIG. 1, there is shown an extrusion die 1 for molding a honeycomb structure such as a catalyst carrier of a catalytic converter for internal combustion engines.

The extrusion die 1 includes material inlet ports 4 and latticed slits 2 communicating with the inlet ports 4. A ceramic material, for example, is forced into the slits 2 through the inlet ports 4 in a conventional manner to form the honeycomb structure.

Each of the slits 2 includes an inlet portion 21 and an outlet portion 22 having a tapered surface 300 continuing from an inner wall of the inlet portion 21. Each of the outlet portions 22 is defined by a metal-plated layer 3 made of, for example, Ni—P (nickel phosphorus) formed on an inner wall 202 of each of the slits 2 and smaller in width than the inlet portion 21 (A<B). Specifically, the width A of the outlet portion 22 of each of the slits 2 is 100 μm, and the width B of the inlet port 21 thereof is 180 μm so that an A-B ratio will range from 0.25 to 0.9, preferably 0.55. If the A-B ratio is less than 0.25, the pressure acting on the metal-plated layers 3 during extrusion becomes too high, causing the metal-plated layers 3 to peel off. Alternatively, if the A-B ratio is greater than 0.9, it will cause the resistance to extrusion of material to be increased undesirably.

Figure 2A:
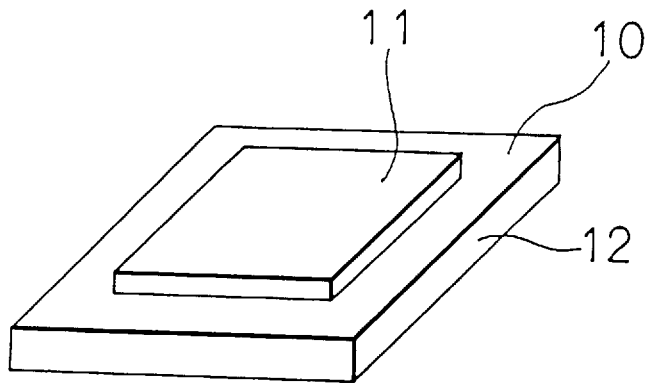
FIGS. 2(a), 2(b) and 2(c) are perspective views which shows a sequence of production steps of the extrusion die in FIG. 1.
Figure 2B:
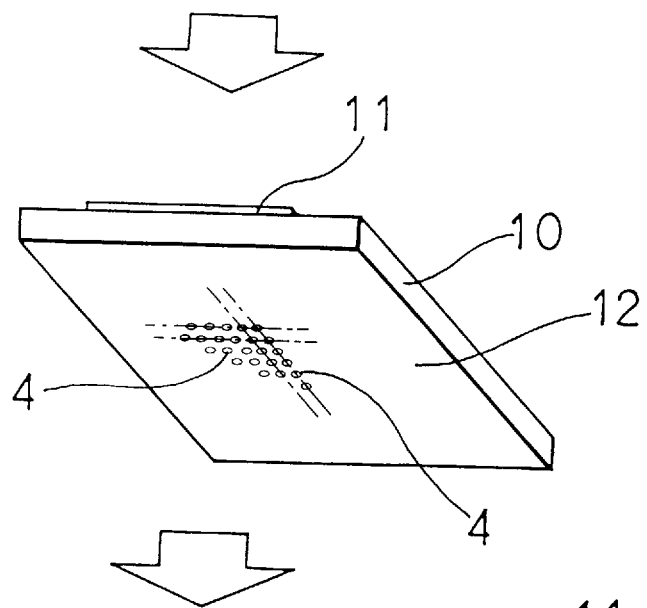
Figure 2C:
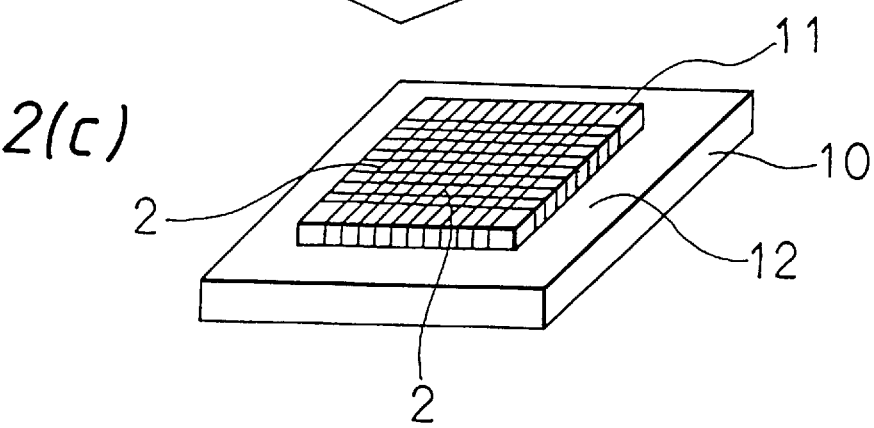

The slits 2 are, as shown in FIG. 2(c) which will be discussed later in detail, arranged in a matrix and have a depth of 2.5 mm.

Each of the inlet ports 4 is, as shown in FIG. 2(b), a circular hole having a diameter of 0.9 mm and a depth of 13 mm and formed in the extrusion die 1 from an upstream direction so as to communicate with a junction of vertical one and horizontal one of the slits 2.

Production steps of the extrusion die 1 will be discussed below with reference to FIGS. 2(a) to 3.

First, an SKD61-steel plate 10 is prepared whose surface is, as shown in FIG. 2(a), machined to form a base 12 and a rectangular stepped portion 11 on a central area of the base 12. The stepped portion 11 has a depth substantially equal to those of the slits 2, while the base 12 has a depth substantially equal to those of the inlet ports 4.

Next, the inlet ports 4 are, as shown in FIG. 2(b), formed by drilling 10000 holes 13 mm deep in the bottom of the base 12 in a matrix arrangement of 100×100.

The slits 2 are, as shown in FIG. 2(c), are formed by machining 10000 grooves in the stepped portion 11 in a matrix arrangement of 100×100. Each of the slits 2 has a constant width of 180μ over a full depth of 2.5 mm.

Finally, the metal-plated layer 3 is formed on a range from the outer wall 203 to an exit portion of the inner wall 202 of each of the slits 2 in the following manner.

Figure 3:
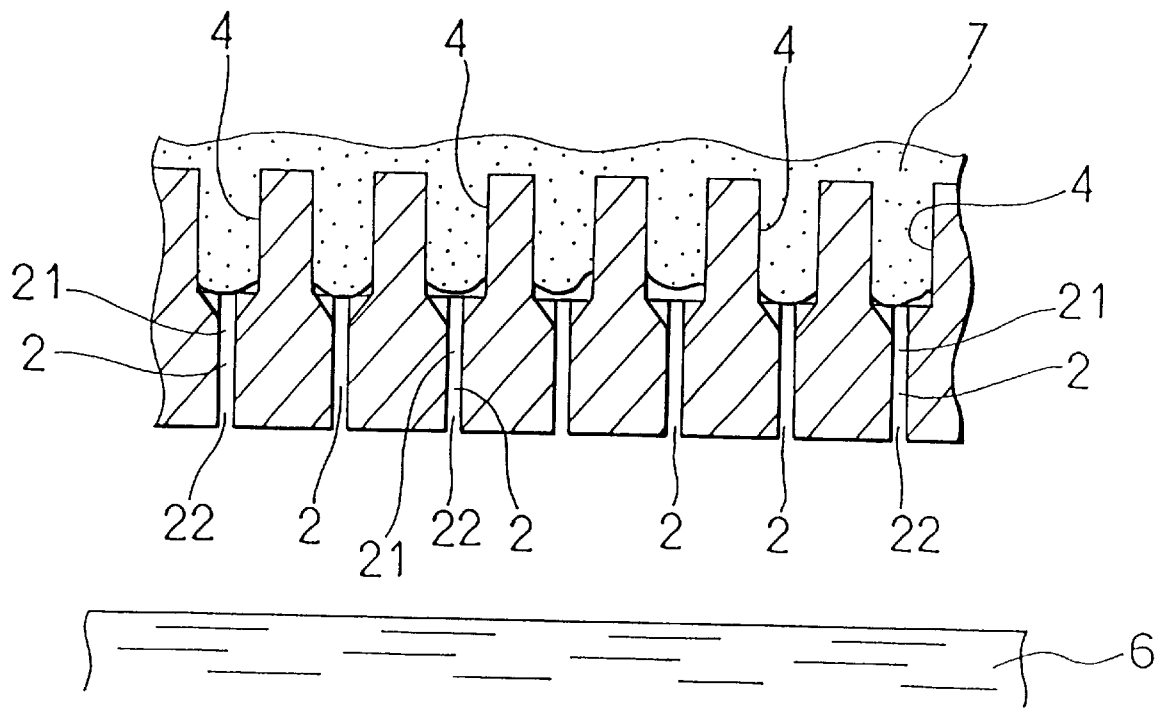
FIG. 3 is a partially cross sectional view which shows an extrusion die when immersed in a plating solution for forming a metal-plated layer in slits.

First, the inlet ports 4 are, as shown in FIG. 3, filled to a given depth with a seal compound 7 such as paraffin wax (e.g., the peel seal manufactured by Nichihicosan Co., Ltd. in Japan). This allows plating reaction at the inlet portions 21 of the slits 2 to be controlled or restricted by a rising gas from the outlet portions 22 of the slits 2 toward the inlet ports 4 during plating when the steel plate 10 is immersed in a plating solution with the slits 2 oriented downward, as will be described below in detail. Specifically, it is possible to control the depth of the metal-plated layer 3 in a lengthwise direction of the slits 2.

The filling of the seal compound 7 is achieved by melting the sealing compound 7 over a pallet to have a thickness sufficient for immersing the inlet ports 4 completely, immersing the steel plate in the melted seal compound 7 with the inlet ports 4 oriented downward, and cooling it to solidify the seal compound 7.

Next, the outlet portions 22 of the slits 2 are oriented downward, and the stepped portion 11 of the steel plate 10 is immersed in a plating solution 6. The whole of the steel plate 10 may be immersed in the plating solution 6, but at least the outlet portions 22 of the slits 2 need to be immersed in the plating solution 6. This allows the inner wall 202 of each of the slits 4 and the outer wall 203, as shown in FIG. 1, to be plated to form the metal-plate layer 3. The plating solution 6 may be an erosion resisting plating solution capable of hardening the metal-plated layer 3 to a desired degree, such as an electroless plating solution containing nickel sulfate to which hypophosphite is added as a reducing agent.

The thickness of the metal-plated layer 3 is determined by the length of time the slits 2 are immersed in the plating solution 6.

In this embodiment, the immersion time is so determined that the thickness of the metal-plated layer 3 is 40 μm.

Finally, the seal compound 7 is removed from the inlet ports 4.

Figure 4:
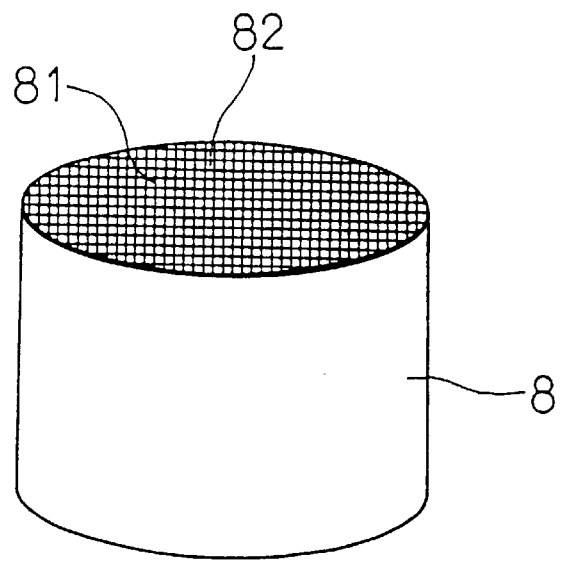
FIG. 4 is a perspective view which shows a catalyst carrier of a catalytic converter used in an internal combustion engine exhaust system.
Figure 5:
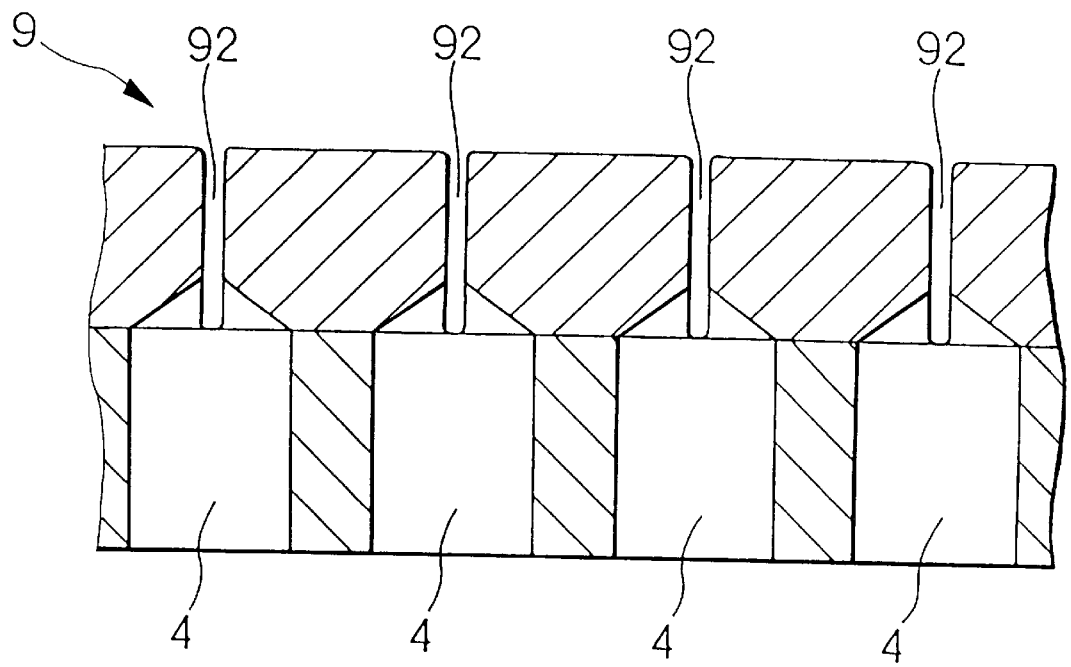
FIG. 5 is a partially cross sectional view which shows a conventional extrusion die.
Figure 6:
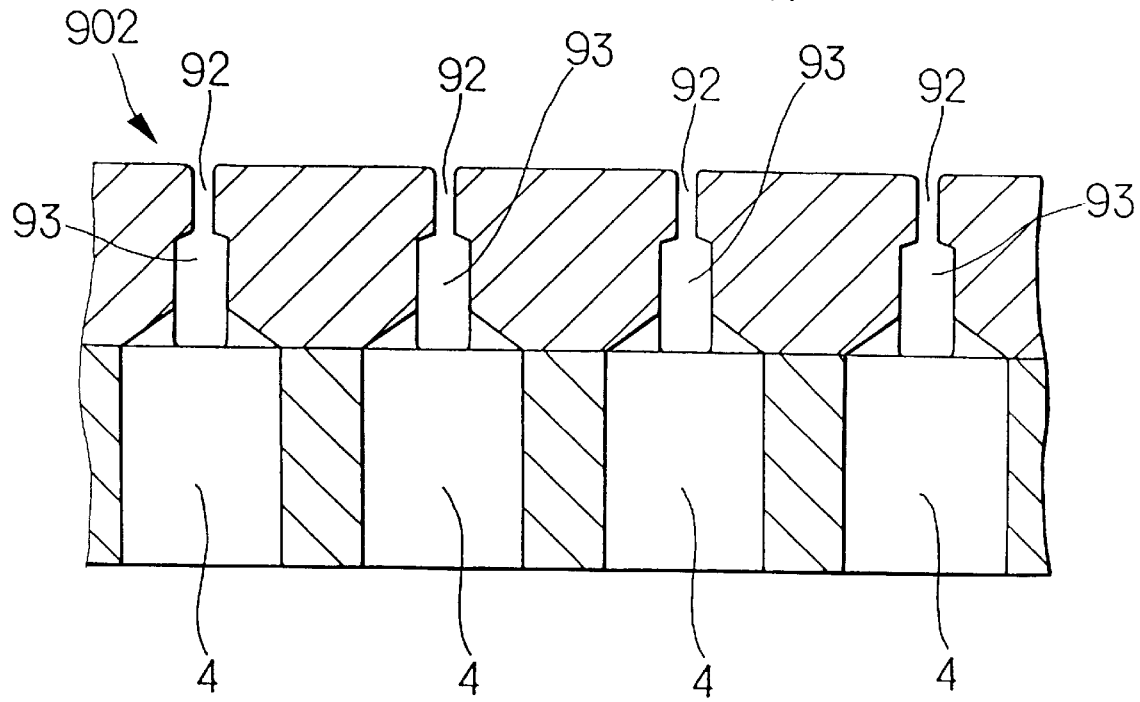
FIG. 6 is a partially cross sectional view which shows another conventional extrusion die.

In extrusion molding, a ceramic material is first forced into the inlet ports 4 of the extrusion die 1 by a conventional extruder. The ceramic material then enters the inlet portions 21 of the slits 2 and spreads therein in a honeycomb form. The honeycombed material passes through the outlet portions 22 while it is decreased in thickness to a desired value and is ultimately extruded from a mask die (not shown) so that it is shaped into a cylindrical honeycomb structure such as the one shown in FIG. 4.

Specifically, the use of the extrusion die 1 of this embodiment facilities easy formation of the cylindrical honeycomb structure having thin honeycomb walls with a smaller extrusion resistance.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A die for extruding a honeycomb structure comprising:
   a base having a first surface and a second surface opposite the first surface;
   material inlet ports formed to extend a prescribed distance into said base from the first surface of said base, through which material for the honeycomb structure is supplied to the die;
   slits formed in the second surface of said base in a matrix arrangement, having first inner walls and second inner walls continuing the first inner walls in alignment therewith, the first inner walls leading to the second surface of said base, the second inner walls leading to said material inlet ports; and metal-plated layers formed on the first inner walls of said slits to define outlets of the die having a width smaller than those of the second inner walls of said slits.

2. A die as set forth in claim 1, wherein a ratio of the width of each of the outlets to the width of each of the second inner walls ranges from 0.25 to 0.9.

3. The die of claim 1, wherein said metal-plated layers comprise nickel phosphorous.

4. A method of manufacturing a die for extruding a honeycomb structure comprising the steps of:

preparing a die base having a first surface and a second surface opposite the first surface;

forming material inlet ports in the first surface of said die base from which material for the honeycomb structure is supplied;

forming in the second surface of said die base latticed slits of a constant width having first inner walls leading to the second surface of said die base and second inner walls leading to said material inlet ports, respectively; and immersing at least the first inner walls of said latticed slits in a plating solution to form plated layers on the first inner walls to define outlets of the die having a width smaller than those of the second inner walls of said slits.

5. A method as set forth in claim 4, further comprising the step of closing said material inlet ports before said immersing step.

6. A method as set forth in claim 4, further comprising the step of filling in said material inlet ports with a given filler prior to said immersing step.

* * * * *